United States Patent
Lindahl

(10) Patent No.: US 7,694,913 B2
(45) Date of Patent: *Apr. 13, 2010

(54) APPARATUS AND METHOD FOR REDUCED BACKLASH STEERING TILLER

(75) Inventor: Gary M. Lindahl, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/358,785

(22) Filed: Jan. 23, 2009

(65) Prior Publication Data

US 2009/0127382 A1 May 21, 2009

Related U.S. Application Data

(62) Division of application No. 11/128,810, filed on May 13, 2005, now Pat. No. 7,513,456.

(51) Int. Cl.
B64C 25/50 (2006.01)
(52) U.S. Cl. .................. 244/50; 244/220; 244/100 R; 280/92
(58) Field of Classification Search .............. 244/102 A, 244/103 S
See application file for complete search history.

(56) References Cited

U.S. PATENT DOCUMENTS

| | | |
|---|---|---|
| 1,593,823 A | 7/1926 | Gleason |
| 1,947,973 A | 2/1934 | Davis |
| 1,993,549 A | 3/1935 | Holmes |
| 2,614,777 A | 10/1952 | Henry et al. |
| 2,626,116 A | 1/1953 | Steuby |
| 2,895,445 A | 7/1959 | Foraker |
| 2,949,256 A | 8/1960 | Stout |
| 3,211,400 A | 10/1965 | Booth |

(Continued)

OTHER PUBLICATIONS

Kollar, Carl, Diverse Electronic Services, "Throttle Pot Box, H-Bridge Motor Controller, motor control, PWM," printed Jan. 6, 2005, pp. 1-3.

Primary Examiner—Michael R Mansen
Assistant Examiner—Brian M O'Hara
(74) Attorney, Agent, or Firm—Harness, Dickey & Pierce, P.L.C.

(57) ABSTRACT

A method is disclosed for steering a mobile platform, where the method may involve: providing a steering component graspable and rotatable by an operator of the mobile platform from a neutral position to first and second positions; coupling an input shaft to the steering component; coupling an input arm to the input shaft so that rotational movement of the input shaft causes rotational movement of the input arm, the input arm being in the neutral position when the steering component is in the neutral position; supporting an idler arm adjacent the input arm and such that portions of the idler arm and the input arm are in contact when the steering component is in the neutral position; and using a biasing system configured to act on the steering arm and the idler arm to maintain the steering component in the neutral position when no force is being applied by the operator to the steering component, to reduce a backlash generated by at least one of the input arm and the idler arm, but to enable clockwise and counterclockwise motion of the input arm in response to an input from the operator using the steering component.

17 Claims, 3 Drawing Sheets

U.S. PATENT DOCUMENTS

| | | | |
|---|---|---|---|
| 3,362,495 A | 1/1968 | Lacey | |
| 3,443,453 A | 5/1969 | Thompson | |
| 4,016,775 A | 4/1977 | Carlson | |
| 4,263,994 A | 4/1981 | Hayes | |
| 4,555,960 A * | 12/1985 | King | 74/471 XY |
| 4,795,952 A * | 1/1989 | Brandstetter | 318/560 |
| 4,948,069 A | 8/1990 | Veaux et al. | |
| 5,002,241 A * | 3/1991 | Tizac | 244/237 |
| 5,042,749 A | 8/1991 | Jacques et al. | |
| 5,070,804 A | 12/1991 | Strazzeri | |
| 5,142,931 A * | 9/1992 | Menahem | 74/471 XY |
| 5,156,363 A | 10/1992 | Cizewski et al. | |
| 6,572,055 B1 | 6/2003 | Bernard | |
| 6,641,085 B1 | 11/2003 | Delea et al. | |
| 6,647,820 B2 | 11/2003 | McKeown et al. | |
| 6,715,438 B1 | 4/2004 | Hundertmark | |
| 6,732,979 B1 * | 5/2004 | Kilner et al. | 244/236 |
| 6,804,892 B1 | 10/2004 | Yung et al. | |
| 7,207,579 B1 | 4/2007 | Howard | |
| 7,513,456 B2 * | 4/2009 | Lindahl | 244/50 |
| 2006/0278755 A1 | 12/2006 | Bachmeyer et al. | |

* cited by examiner

APPARATUS AND METHOD FOR REDUCED BACKLASH STEERING TILLER

CROSS-REFERENCE TO RELATED APPLICATIONS

This application is a divisional of U.S. patent application Ser. No. 11/128,810 filed on May 13, 2005, and presently issued U.S. Pat. No. 7,513,456. The disclosure of the above application is incorporated herein by reference.

FIELD

The present disclosure relates to steering systems for mobile platforms, and more particularly to a system and method for forming a zero backlash steering tiller.

BACKGROUND

Various mechanisms may be employed to guide mobile platforms. For example, in a commercial aircraft application, a nose wheel is generally employed to steer the aircraft upon landing. The nose wheel is most typically mechanically coupled to a nose gear. Generally, the nose gear is in turn coupled to a steering mechanism, such as a tiller, in the cockpit for receipt of an input from a pilot. Thus, as the input from the pilot is transferred to the nose gear from the tiller, the nose gear serves to move the nose wheel to guide the aircraft based on the input.

Generally, most tillers have at least a small degree of backlash which provides undesirable feedback to pilots while steering. This can cause the vehicle to drift off course or provide numerous small inputs to the steering system which can prematurely wear out the system. Accordingly, it is desirable to provide a steering tiller that substantially or completely eliminates the backlash in the steering tiller.

SUMMARY

In one aspect the present disclosure relates to a method for steering a mobile platform. The method may involve: providing a steering component graspable and rotatable by an operator of the mobile platform from a neutral position to first and second positions; coupling an input shaft to the steering component; coupling an input arm to the input shaft so that rotational movement of the input shaft causes rotational movement of the input arm, the input arm being in the neutral position when the steering component is in the neutral position; supporting an idler arm adjacent the input arm and such that portions of the idler arm and the input arm are in contact when the steering component is in the neutral position; and using a biasing system configured to act on the steering arm and the idler arm to maintain the steering component in the neutral position when no force is being applied by the operator to the steering component, to reduce a backlash generated by at least one of the input arm and the idler arm, but to enable clockwise and counterclockwise motion of the input arm in response to an input from the operator using the steering component.

In another aspect the present disclosure may involve a method for steering a mobile platform. The method may involve: providing a steering handle graspable and rotatable by an operator of the mobile platform from a neutral position in clockwise and counterclockwise directions to first and second positions; coupling an input shaft to the steering handle; coupling an input arm to the input shaft so that rotational movement of the input shaft causes rotational movement of said input arm, the input arm being in said neutral position when said steering handle is in said neutral position; supporting an idler arm adjacent said input arm and such that portions of said idler arm and said input arm are in contact when said steering handle is in said neutral position; using a pair of springs arranged to provide counteracting biasing forces on said steering arm and said idler arm to maintain said steering handle in said neutral position when no rotational force is being applied by said operator to said steering handle, to reduce a backlash generated by at least one of said input arm and said idler arm, but to still enable clockwise and counterclockwise motion of said input arm in response to a rotational force by the operator on the steering handle.

In still another aspect the present disclosure relates to a method for steering an aircraft. The method may involve: providing a steering handle graspable and rotatable by an operator of the aircraft from a neutral position in clockwise and counterclockwise directions to first and second positions; coupling an input shaft to the steering handle; coupling an input arm to the input shaft so that rotational movement of the input shaft causes rotational movement of said input arm, the input arm being in said neutral position when said steering handle is in said neutral position; supporting an idler arm adjacent said input arm and such that portions of said idler arm and said input arm are in contact when said steering handle is in said neutral position; using a pair of springs arranged to provide counteracting biasing forces on said steering arm and said idler arm to maintain said steering component in said neutral position when no rotational force is being applied by said operator to said steering handle, to reduce a backlash generated by at least one of said input arm and said idler arm, but to still enable clockwise and counterclockwise motion of said input arm in response to a rotational force by the operator on the steering handle; sensing a rotational position of said input shaft; and using said sensed rotational position of said input shaft to control a steering movement of a wheel assembly of said aircraft.

The features, functions, and advantages can be achieved independently in various embodiments of the present disclosure or may be combined in yet other embodiments.

BRIEF DESCRIPTION OF THE DRAWINGS

The present disclosure will become more fully understood from the detailed description and the accompanying drawings, wherein.

DETAILED DESCRIPTION

The following description of the various embodiments is merely exemplary in nature and is in no way intended to limit the present disclosure, its application or uses. Although the following description is related generally to a steering system for use in a mobile platform, such as an aircraft, the system could also be potentially implemented in a marine vessel, a train or a land based motor vehicle. Thus, it will be understood that the embodiments described in the present disclosure could be employed in a wide variety of applications. Therefore, it will be understood that the following discussions are not intended to limit the scope of the appended claims.

Figure 1:
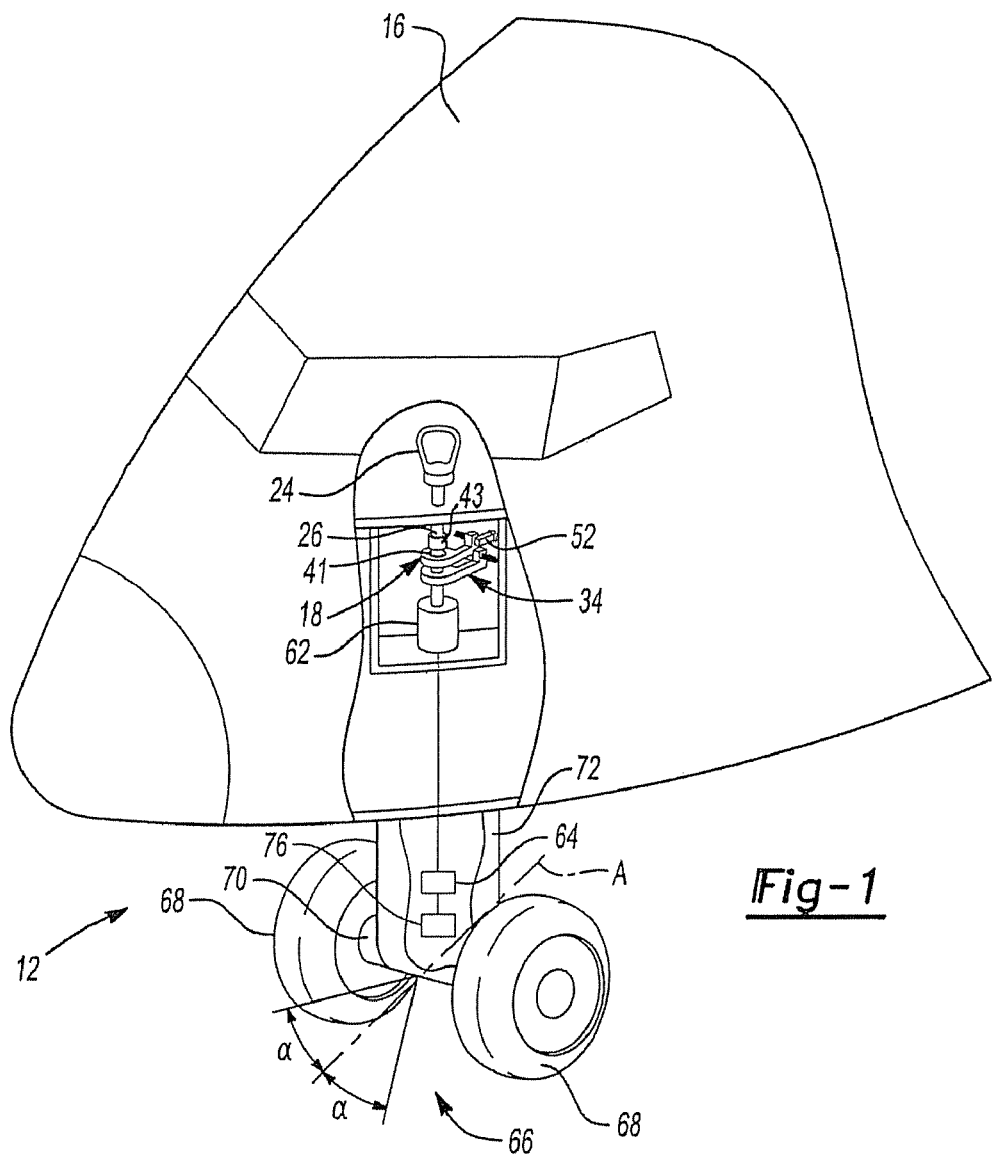
FIG. 1 is an environmental view of an aircraft employing the backlash reduction steering tiller according to various embodiments of the present disclosure.

With reference to FIG. 1, a steering system 10 for a mobile platform, such as an aircraft 12, is illustrated. The steering system 10 operates generally to change the direction of the aircraft 12. The steering system 10 includes an input mechanism 14, a portion of which is disposed in a cockpit 16 of the aircraft 12.

Figure 2:
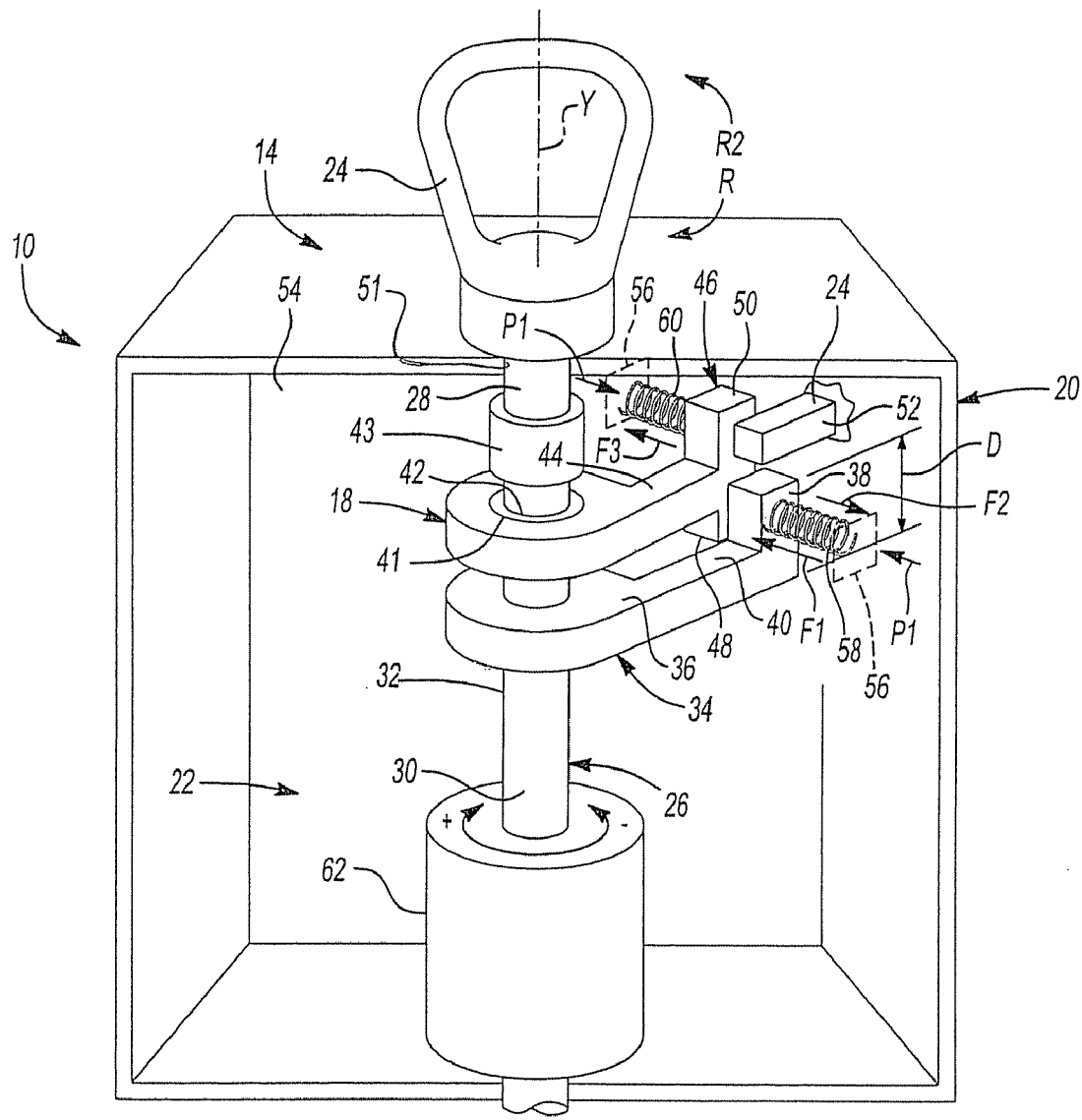
FIG. 2 is a perspective view of a zero backlash steering tiller according to one embodiment.
Figure 3:
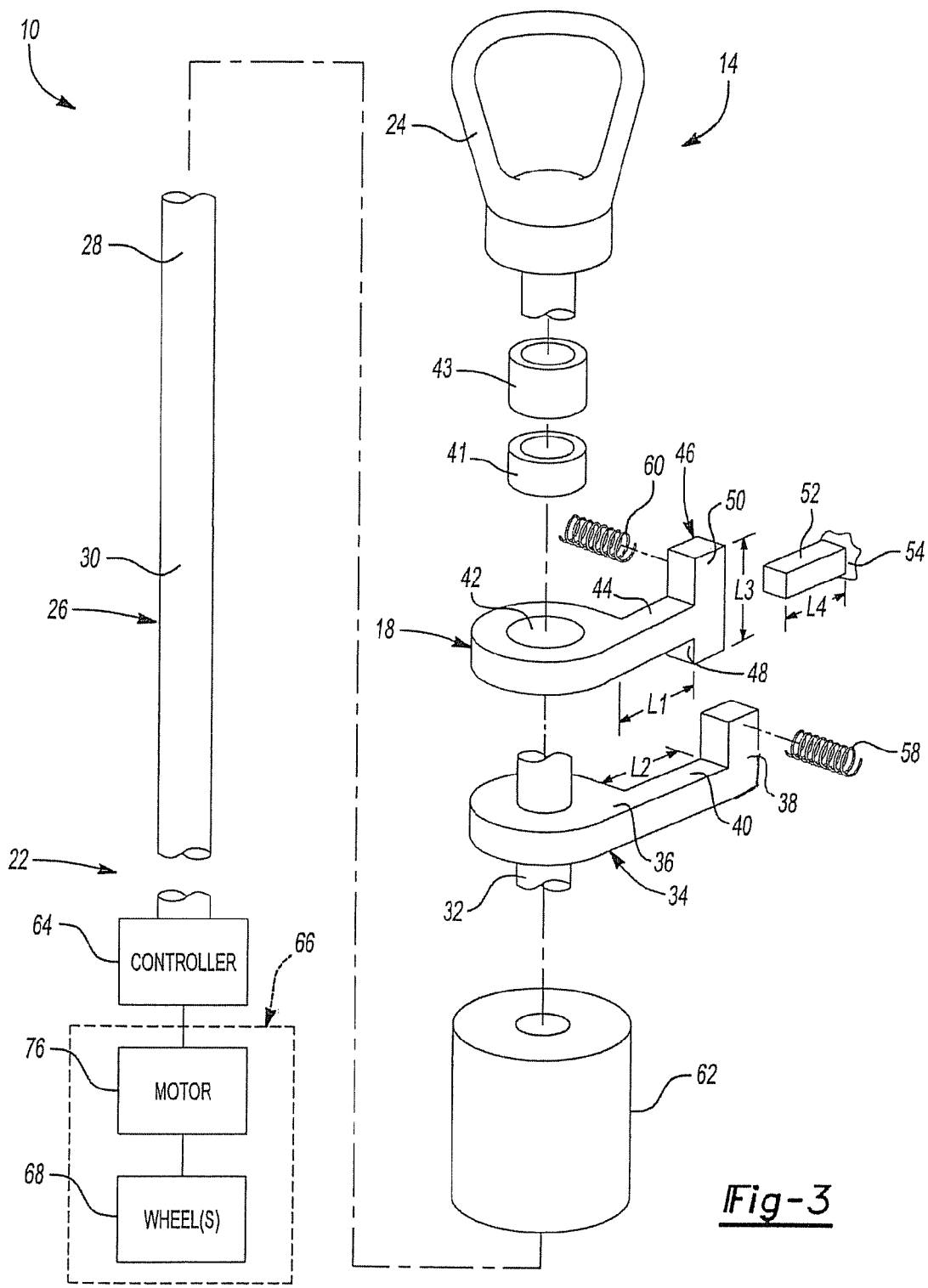
FIG. 3 is an exploded view of the backlash reduction steering tiller according to various embodiments.

Referring to FIGS. 2 and 3, the input mechanism 14 is coupled to an idler 18. A housing 20 may be disposed about the idler 18 and a portion of the input mechanism 14. The idler 18 may also be coupled to a steering mechanism 22.

The input mechanism 14 includes a user interface, such as a handle 24, coupled to an input shaft 26. Although handle 24 is illustrated as forming the graspable steering element, it will be understood that a variety of other mechanisms could be used to interface with an occupant of the cockpit 16, such as a joystick, lever, knob, or other appropriate mechanism by which an occupant of the cockpit 16 may manipulate a steering element.

The input shaft 26 includes a first end 28 coupled to the handle 24, a second end 30 coupled to the steering mechanism 22 and a central portion 32. The input shaft 26 is generally configured to rotate about a Y-axis upon receipt of an input "R" or "R2" from the occupant applied through the handle 24. The input shaft 26 further includes an input arm 34 which may be integrally formed in the central portion 32, or coupled to the central portion 32 through a post processing step, such as welding.

The input arm 34 is generally circular, but may include a protrusion 36 having a vertically extending branch 38. The protrusion 36 may be sized to enable the branch 38 to engage the idler 18. The branch 38 may extend a selected distance "D" above a surface 40 of the input arm 34 to enable the input arm 34 to contact the idler 18.

The idler 18 is also preferably generally circular in shape, with a central opening 42. The central opening 42 is generally sized to enable the idler 18 to be rotatably coupled to the input shaft 26. The idler 18 is free to rotate on the input shaft 26, typically using a bearing 41. The idler 18 could be restrained to prevent movement up or down the input shaft 26 by a collar 43 on the input shaft 26 above the input arm 34. The idler 18 may further include a neck 44 having a generally T-shaped branch 46. The neck 44 may be sized to extend a length "L1" from the input shaft 26, which may typically be equivalent to a length "L2" between the input shaft 26 and branch 38 of the input arm 34.

The T-shaped branch 46 may have a first end 48 and a second end 50. The T-shaped branch 46 may be sized with a length "L3" which is configured to enable the first end 48 of the T-shaped branch 46 to contact the branch 38 of the input arm 34 and the second end 50 of the T-shaped branch 46 to contact the housing 20 as will be described in greater detail below.

The housing 20 may include a central opening 51 to enable the input shaft 26 to pass therethrough. The housing 20 may also be configured to enclose the idler 18 and input arm 34 of the input mechanism 14, however, it will be understood that the shape and configuration of the housing 20 may vary for different applications. The housing 20 generally includes a stop 52 formed on an interior surface 54 of the housing 20. The stop. 52 extends a length L4 from the interior surface 54 to act as a contact surface for the T-shaped branch 46 of the idler 18. Thus, the length L4 of the stop 52 may be any length which is required to inhibit the movement of the idler 18 beyond the stop 52. The housing 20 further includes two cavities 56 (illustrated in dashed lines for clarity) formed on the interior surface 54 for receipt of a first spring 58 and a second spring 60. The first spring 58 may be positioned to contact the input arm 34, and apply a pre-load force to the input arm 34, while the second spring 60 may be positioned within the housing 20 to contact the idler 18 and apply a pre-load force to the idler 18. Generally, the first and second springs 58, 60 are coil springs, however, any suitable biasing member could be employed, such as torsion springs which could apply torque about the input shaft 26 (not shown). The housing 20 may enclose the steering mechanism 22. The housing 20 provides a means to mount the steering mechanism 22 within the aircraft 12 and keeps foreign objects from jamming the steering mechanism 22.

The steering mechanism 22 is coupled to the second end 30 of the input shaft 26, and may, depending upon the desired configuration, be situated entirely within the housing 20. The steering mechanism 22 includes a position transducer 62, a controller 64 and a wheel assembly 66. It will be understood, however, that the position transducer 62 and controller 64 may be substituted for a mechanical linkage to a mechanical steering system, as is generally known in the art.

The position transducer 62 is generally coupled to the second end 30 of the input shaft 26. The position transducer 62 operates to convert the rotational input of the input shaft 26 to a positive or negative electrical signal, depending upon the rotation of the input shaft 26. For example, the rotation of the input shaft 26 clockwise may generate a positive electrical signal, and the rotation of the input shaft 26 counterclockwise may generate a negative electrical signal, and vice versa, however, any method of electrically distinguishing between the clockwise and counterclockwise direction could be employed. The position transducer 62 is in electrical communication with the controller 64.

The controller 64 is in communication with the position transducer 62 and the wheel assembly 66. The controller 64 is operable to convert the electrical signal received from the position transducer 62 into a desired movement for the wheel assembly 66, as will be discussed in greater detail below. It will be understood, however, that although the controller 64 is described herein as converting the electrical signal from the position transducer 62, any appropriate position detecting mechanism could be employed.

The wheel assembly 66 is in communication with the controller 64 and generally operates to guide the aircraft 12 based on the input received from the controller 64. The wheel assembly 66 may include at least one wheel 68, however, two wheels 68 are generally used in large aircraft applications. For example, the wheels 68 typically rotate about an axis 70 which may be supported by a structure 72. The structure 72 may couple the wheels 68 to a motor 76. The motor 76 may be in communication with the controller 64 to pivot the wheel assembly 66 to a desired angle a about an axis A based upon the input received from the controller 64, as will be described in greater detail below. Generally, the angle a to which the wheel assembly 66 rotates is between 65 and 75 degrees. The motor 76 may be any appropriate type of motor which is capable of pivoting the wheel assembly 66 about an axis to enable the aircraft 12 to change direction.

Referring further to FIG. 2, in order to guide or steer the aircraft 12, the operator in the cockpit 16 may apply a force "R" to the handle 24 of the input mechanism 14. Generally, prior to the application of the force "R" to the handle 24, the handle 24 is in a standard position, with the first and second springs 58, 60 each applying a pre-load force "P1" to the input arm 34 and idler 18, respectively. The force "R" applied by the occupant to the handle 24 will cause the input shaft 26 of the input mechanism 14 to rotate, which in turn causes the input arm 34 of the input shaft 26 to apply a force F2 against either the first spring 58 or the idler 18, and which also causes the idler 18 to apply a force "F3" to the second spring 60, depending upon the direction of the rotation of the input shaft 26.

For example, if the operator in the cockpit 16 applies the force R clockwise, the input shaft 26 will rotate clockwise, and the input arm 34 will apply the force "F2" against the first spring 58. Further, when the input shaft 26 rotates clockwise, the idler 18 is prevented from rotating clockwise due to the stop 52 formed on the interior surface 54 of the housing 20. Alternatively, if the operator in the cockpit 16 applies the force R counterclockwise, then the input shaft 26 will rotate counterclockwise, causing the branch 38 of the input arm 34 to apply the force "F1" to the T-shaped branch 46 of the idler 18. The application of the force "F1" from the input arm 34 will in turn cause the idler 18 to apply the force "F3" against the second spring 60.

As the input shaft 26 of the input mechanism 14 rotates, the position transducer 62 converts the rotation of the input shaft 26 into the corresponding electrical signal. For example, if the input shaft 26 is rotated clockwise by the occupant of the cockpit 16, then the position transducer 62 may generate a positive electrical signal which is then transmitted to the controller 64. Similarly, as an example, if the occupant in the cockpit 16 rotates the input shaft 26 counterclockwise, the position transducer 62 may generate a negative electrical signal which is then communicated to the controller 64. Then, depending upon the electrical signal generated by the position transducer 62, the controller 64 may signal the motor 76 to pivot the wheel assembly 66 to a desired angle a about the axis A.

After the occupant of the cockpit 16 has completed the desired maneuver of the aircraft 12, the occupant of the cockpit 16 may then rotate the handle 24 to the starting position, while allowing straightforward motion of the aircraft 12. The use of the first and second springs 58, 60 ensures that when the input shaft 26 is in the starting position, it will return to the precise starting position with no backlash or slop when the handle 24 is released. This prevents the controller 64 from receiving numerous readings from the position transducer 62 as the first and second springs 58, 60 prevent small movements of the input shaft 26 when the input shaft 26 is near the starting position. In addition, if the occupant of the cockpit 16 desires to apply a counterforce R2 in a direction opposite the force R, then it should be noted that the first and second springs 58, 60 enable the occupant of the cockpit 16 to smoothly transition through the starting position to guide the aircraft 12 in the opposite direction.

The present disclosure provides a steering mechanism with essentially little or no backlash, and which does not require adjustment, even if the first and second springs 58, 60 have a loss of pre-load force P1. Specifically, the use of the first and second springs 58, 60 against the input arm 34 and idler 18 serves to remove the backlash from the steering system 10. The use of the first and second springs 58, 60 also eliminates the need for adjustment to the steering system 10 to stay at zero backlash. Thus, the steering system 10 essentially forms a self-calibrating system that maintains the handle 24 at a designated "zero" position, while simultaneously removing the backlash that would otherwise be present in a convention steering system.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for steering a mobile platform, the method comprising:

providing a steering component graspable and rotatable by an operator of the mobile platform from a neutral position to first and second positions;

coupling an input shaft to the steering component;

coupling an input arm to the input shaft so that rotational movement of the input shaft causes rotational movement of said input arm, the input arm being in said neutral position when said steering component is in said neutral position;

supporting an idler arm adjacent said input arm and such that portions of said idler arm and said input arm are in contact when said steering component is in said neutral position;

positioning a fixedly disposed stop on a portion of a housing used to house said input arm and said idler arm, said stop being positioned adjacent to said idler arm and said input arm, and wherein a first portion of said idler arm is in contact with the stop and a second portion of said idler arm is in contact with the input arm when the steering component is in the neutral position;

using a biasing system configured to act on said steering component and said idler arm to maintain said steering component in said neutral position when no force is being applied by said operator to said steering component, to reduce a backlash generated by at least one of said input arm and said idler arm, but to enable clockwise and counterclockwise motion of said input arm in response to an input from the operator using the steering component; and configuring said biasing system to include a first spring for urging said idler arm against said stop and a second spring for urging said input arm against said idler arm.

2. The method of claim 1, further comprising:

using said stop to project from an interior surface of said housing, and to contact and limit movement of said idler arm in one of a clockwise and counterclockwise direction.

3. The method of claim 2, wherein said using a biasing system comprises using said springs within said housing and to exert counteracting biasing forces on said idler arm and said input arm.

4. The method of claim 3, further comprising using said second portion of said idler arm and said input arm to abut one another when said steering component is in said neutral position.

5. The method of claim 1, further comprising using rotational movement of said input arm to provide an input signal to a position transducer.

6. The method of claim 5, further comprising using said position transducer to generate a position signal, in response to said input signal, that is indicative of a rotational position of said input arm, and thus said steering component, and providing said position signal to a controller.

7. The method of claim 6, further comprising using said controller to control movement of a steering assembly in response to said position signal.

8. The method of claim 1, wherein said method for steering a mobile platform comprises a method for steering an aircraft.

9. A method for steering a mobile platform, the method comprising:

providing a steering handle graspable and rotatable by an operator of the mobile platform from a neutral position in clockwise and counterclockwise directions to first and second positions;

coupling an input shaft to the steering handle;

coupling an input arm to the input shaft so that rotational movement of the input shaft causes rotational movement of said input arm, the input arm being in said neutral position when said steering handle is in said neutral position;

supporting an idler arm adjacent a fixed stop;

disposing idler arm such that a first portion of said idler arm is in contact with said fixed stop when said steering handle is in said neutral position;

disposing said input arm such that a second portion of said idler arm and said input arm are in contact when said steering handle is in said neutral position;

using a pair of springs arranged to provide counteracting biasing forces on said steering handle and said idler arm to maintain said steering handle in said neutral position, with said first portion of said idler arm held against said fixed stop and said input arm held against said second portion of said idler arm, when no rotational force is being applied by said operator to said steering handle, to reduce a backlash generated by at least one of said input arm and said idler arm, but to still enable clockwise and counterclockwise motion of said input arm in response to a rotational force by the operator on the steering handle.

10. The method of claim 9, further comprising arranging said idler arm and said input arm within a housing.

11. The method of claim 10, further comprising forming recesses within interior wall portions of said housing for receiving portions of said pair of biasing springs.

12. The method of claim 10, further comprising forming said idler arm with a central opening for receiving said input shaft therethrough.

13. The method of claim 12, further comprising using a bearing between said central opening and said input shaft to permit free rotational movement of said idler arm relative to said input shaft.

14. The method of claim 9, further comprising using a position transducer to sense a rotational position of said input shaft.

15. The method of claim 14, further comprising using a controller responsive to an output of said position transducer to determine a rotational position of said input shaft, and using said rotational position to control steering motion of a wheel assembly.

16. A method for steering an aircraft, comprising:

providing a steering handle graspable and rotatable by an operator of the aircraft from a neutral position in clockwise and counterclockwise directions to first and second positions;

coupling an input shaft to the steering handle;

coupling an input arm to the input shaft so that rotational movement of the input shaft causes rotational movement of said input arm, the input arm being in said neutral position when said steering handle is in said neutral position;

supporting an idler arm adjacent said input arm and adjacent a fixed stop member, and further such that a first portion of said idler arm is in contact with said fixed stop member when said steering handle is in said neutral position, and such that a second portion of said idler arm is in contact with said input arm when said steering handle is in said neutral position;

using a pair of springs arranged to provide counteracting biasing forces on said steering arm and said idler arm to maintain said steering handle in said neutral position when no rotational force is being applied by said operator to said steering handle, to reduce a backlash generated by at least one of said input arm and said idler arm, but to still enable clockwise and counterclockwise motion of said input arm in response to a rotational force by the operator on the steering handle;

sensing a rotational position of said input shaft; and using said sensed rotational position of said input shaft to control a steering movement of a wheel assembly of said aircraft.

17. The method of claim 16, further comprising:

disposing said idler arm and said input arm within a housing; and supporting said biasing springs such that a portion of each of said springs is in contact with an interior surface of said housing; and wherein said using fixed stop member is disposed within said housing to limit rotational movement of said idler arm in one of said clockwise and counterclockwise directions to a predetermined position.

* * * * *